United States Patent [19]
Fern et al.

[11] 3,955,336
[45] May 11, 1976

[54] CARTRIDGE LOADING APPARATUS

[75] Inventors: Robert W. Fern; Robert B. Kimura, both of Toledo, Ohio

[73] Assignee: Libbey-Owens-Ford Company, Toledo, Ohio

[22] Filed: Sept. 19, 1974

[21] Appl. No.: 507,408

[52] U.S. Cl. .................................. 53/59 R; 53/163; 53/245; 214/6 H
[51] Int. Cl.² ...................... B65B 57/10; B65B 5/10
[58] Field of Search ............ 53/59 R, 163, 245, 254, 53/315; 214/6 H

[56] References Cited
UNITED STATES PATENTS

| | | | |
|---|---|---|---|
| 2,481,508 | 9/1949 | Gschwend et al. | 53/315 |
| 2,855,737 | 10/1958 | Chase et al. | 53/245 X |
| 2,935,830 | 5/1960 | Collins et al. | 53/254 |
| 3,222,845 | 12/1965 | Schweiker | 53/245 |
| 3,672,118 | 6/1972 | DeJong et al. | 53/245 X |

Primary Examiner—Travis S. McGehee
Attorney, Agent, or Firm—Collins, Oberlin & Darr

[57] ABSTRACT

A cartridge loading apparatus including a guide arrangement for directing articles in a desired orientation from a receptacle in which the articles are randomly deposited to a cartridge and means for loading the articles in a trough formed in the cartridge in a desired stacked relation. A slide block is mounted in the trough for movement therein to progressively increase the effective length of the trough assuring the proper disposition and stacking of the articles in the desired attitude within the trough.

9 Claims, 9 Drawing Figures

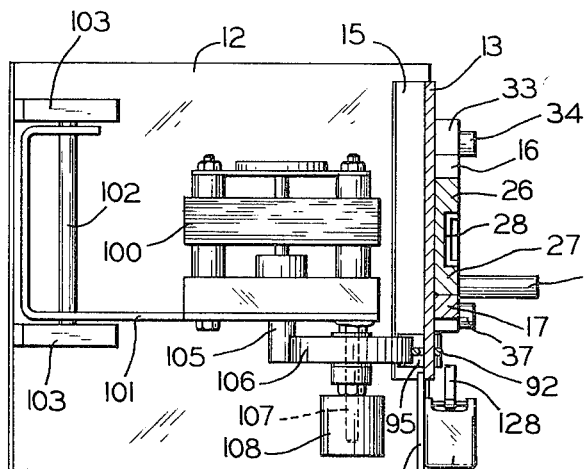
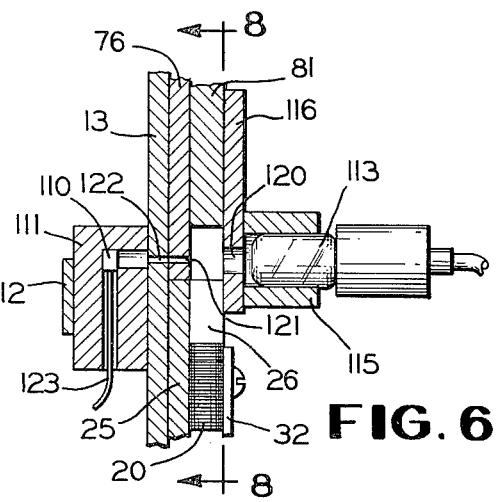
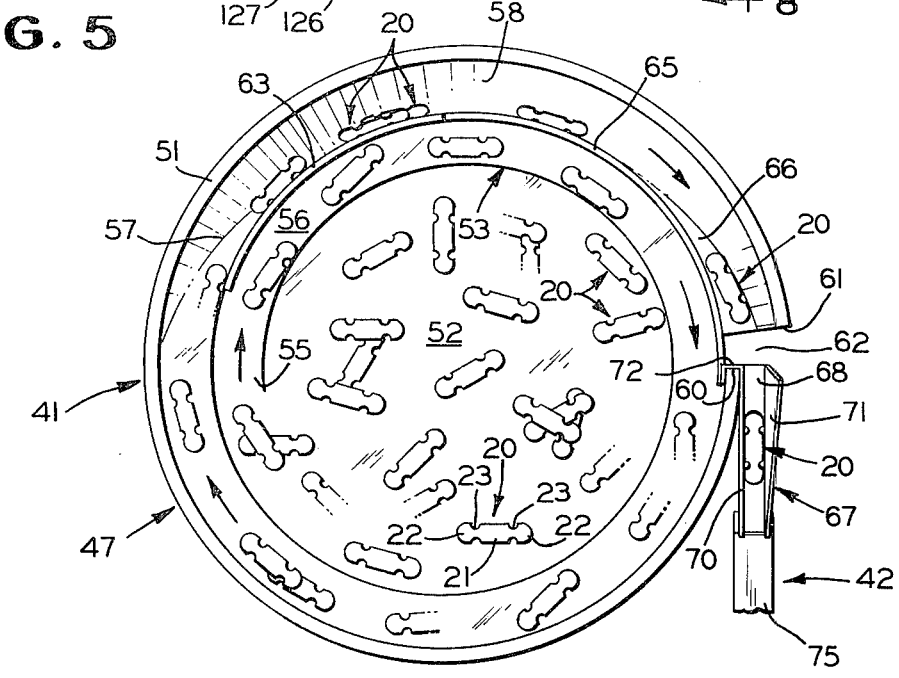
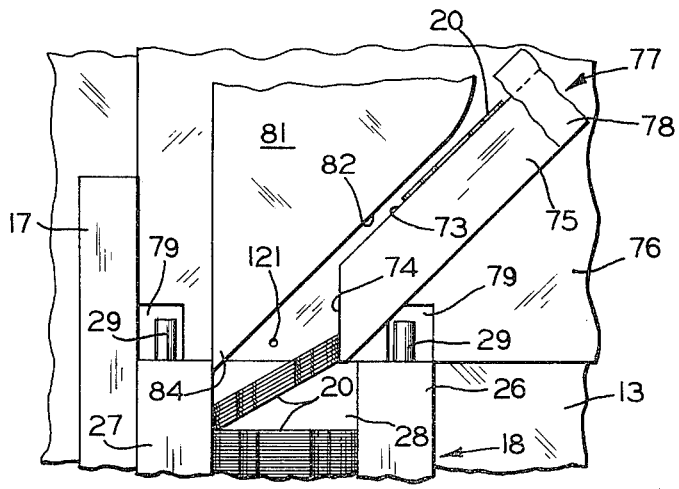
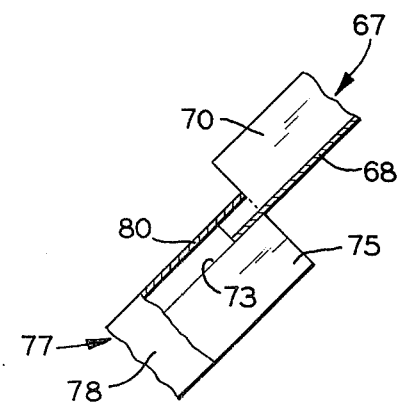

CARTRIDGE LOADING APPARATUS

BACKGROUND OF THE INVENTION

In the production of antenna-type windshields, machines have been designed to apply the antenna wires to and embed the same automatically in a plastic interlayer, which is subsequently sandwiched between a pair of glass sheets to form the well known laminated glass windshield. These built-in antennas are formed of two substantially inverted "L" shaped lengths of wire positioned in a closely spaced back-to-back relation, the ends of which are secured to a thin metallic plate or tab to form a connection adapted to receive electrical leads for the radio antenna system.

The invention described and claimed in U.S. patent application Ser. No. 443,479, filed Feb. 19, 1974, disclosed an apparatus for automatically laying and positioning the connecting tab on the antenna wire end portions during the production of the plastic interlayer for these laminated antenna windshields. This apparatus is provided with a magazine for storing a supply of connecting tabs which are singly ejected therefrom for placement on the plastic interlayer in a precise orientation relative to the antenna wires. The magazine is an integral part of the tab laying apparatus and poses problems when it is necessary to load a supply of such tabs therein in the desired abutting, stacked relation required for proper sequential ejection in the automatic operation of the apparatus.

SUMMARY OF THE INVENTION

The primary object of the present invention is to provide a new and useful apparatus for automatically loading articles in the desired orientation in a cartridge for subsequent transfer into the magazine or storage container of a production machine.

Another object of this invention is to provide the foregoing loading apparatus with means for guiding and directing articles randomly placed in a receptacle into a cartridge in the final stacked, nested condition required for ultimate usage.

Generally speaking, the apparatus of the present invention is characterized by the provision of an article loading apparatus operative in conjunction with a vibratory feeding receptacle for delivering articles from such receptacle through an article guide arrangement to a cartridge and stacking the same in a trough formed in the cartridge in a flat, abutting relation extending transversely of the trough for subsequent convenient usage. A slide block is mounted in the trough for reciprocal movement therein to change the effective length of the trough and thereby control proper stacking of the articles therein.

Further and more detailed objects and advantages of the invention will become clearly apparent in the course of the following description when taken in conjunction with the accompanying drawings.

BRIEF DESCRIPTION OF THE DRAWINGS

In the drawings, wherein like numerals are employed to designate like parts throughout:

FIG. 5 is a cross sectional view, partly in plan, taken along the line 5—5 of FIG. 3;

FIG. 6 is a vertical sectional view, on an enlarged scale, taken along the line 6—6 of FIG. 4;

FIG. 7 is a top plan view, on a enlarged scale, of the vibrating bowl incorporated in the apparatus of this invention;

FIG. 8 is a front elevation view with parts removed for ease of illustration, looking in the direction of arrows 8—8 in FIG. 6, showing the article guide arrangement incorporated in the apparatus of this invention; and FIG. 9 is a fragmentary vertical sectional view, partly in elevation, on an enlarged scale, of a portion of the article guide arrangement incorporated in the apparatus of the invention.

DESCRIPTION OF THE PREFERRED EMBODIMENT

Figure 1:
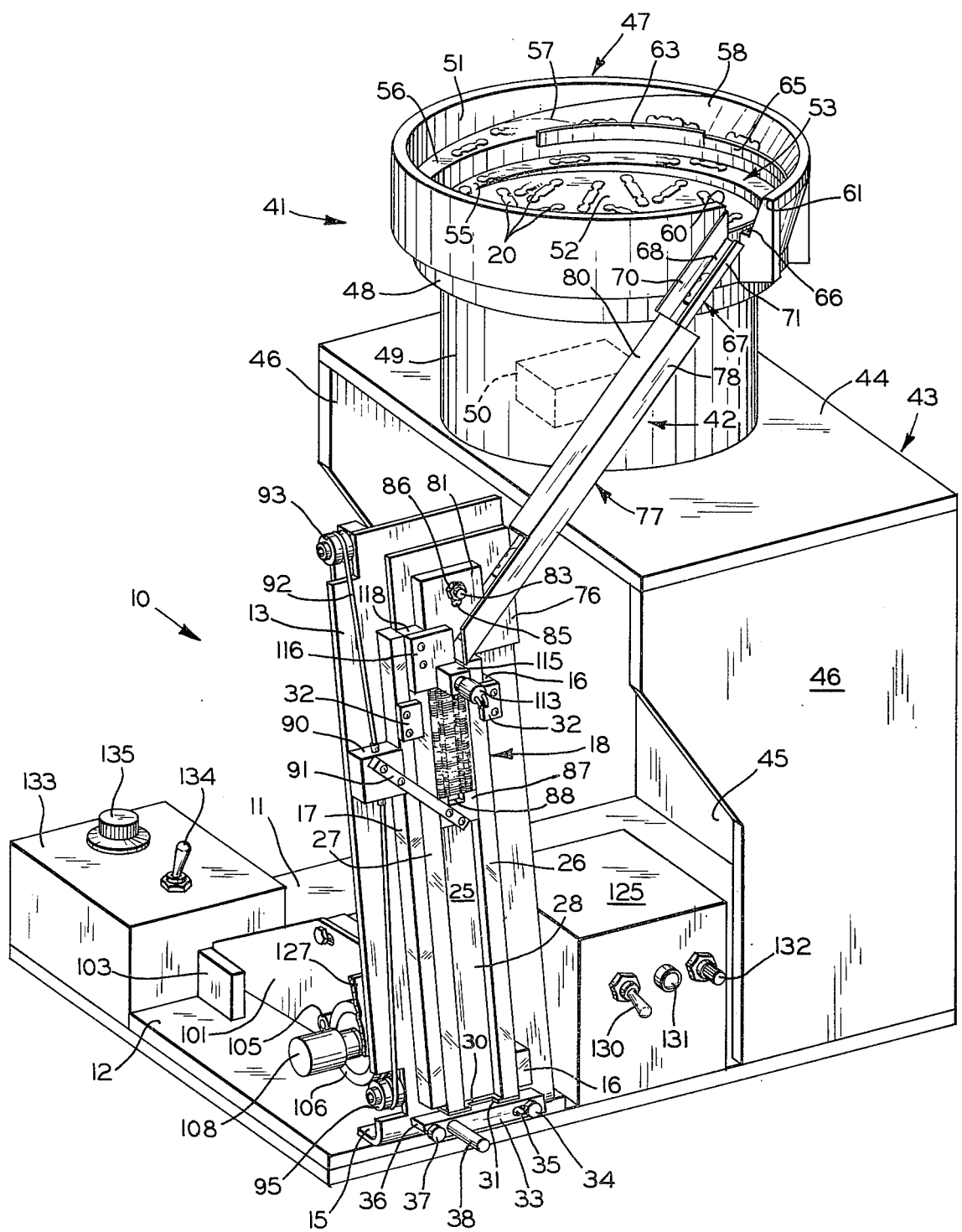
FIG. 1 is a perspective view of a cartridge loading apparatus constructed in accordance with this invention.

Referring now in detail to the illustrative embodiment depicted in the drawings, there is shown in FIG. 1 an article loading apparatus, comprehensively designated 10, comprising a base member 11 having a mounting plate 12 suitably rigidly secured thereon. An upright main support member 13, disposed at a slight angle from a true vertical, is provided at its lower end with an integral flange 15 rigidly secured to mounting plate 12. A pair of vertically spaced guide blocks 16 are fixedly secured to main support member 13 adjacent the lower and upper ends thereof in laterally spaced relation from an elongated guide bar 17 extending longitudinally of member 13 for receiving a removable cartridge, generally designated 18, therebetween. The cartridge 18 is adapted to receive a plurality of articles therein in a stacked relation as will presently appear.

While the configuration of the articles loaded into cartridge 18 can vary, as desired, it will be convenient to describe the apparatus of this invention in connection with the loading of specially configurated, flat tabs 20 utilized in the preparation of plastic sheets for use as interlayers in laminated windshields of the type incorporating built-in antenna wire systems therein. Such a tab, as best illustrated in FIG. 7, comprises a thin flat elongated metal body having a substantially rectangular central portion 21 in plan, with generally semi-circular end portions 22 connected thereto by neck portions 23.

Figure 2:
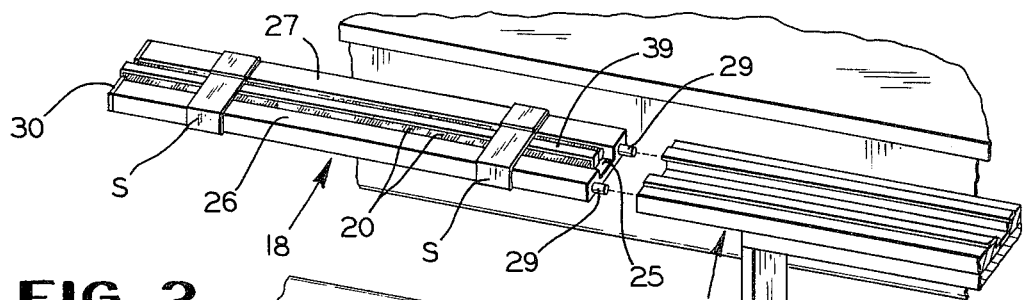
FIG. 2 is a fragmentary perspective view, illustrating a loaded cartridge adapted to be attached to a magazine for transferring the load of articles thereto for subsequent usage in the machine in which the magazine is incorporated.

As best shown in FIGS. 1 and 2, cartridge 18 comprises a body having a generally U-shaped configuration in cross section and comprising an elongated back plate 25 and a pair of laterally spaced side bars 26 and 27 coextensive therewith to form an elongated cavity or trough 28 for receiving the tabs 20 in a stacked nested relation with their longitudinal axes extending transversely of trough 28 and the longitudinal edges thereof supported against back plate 25. An end plate 30 is rigidly secured to the rear end of cartridge 18 and has the same general outline as the end elevational shape of cartridge 18, but is provided with a rectangular cut-out section 31 of lesser dimension that the cartridge trough 28 to retain the tabs 20 therein. The cut-out section 31 provides access for an attendant's finger or some appropriate hand tool to displace the tabs 20 axially along trough 28. A pair of laterally spaced pins 29 project axially forwardly (FIG. 2) from the forward end of cartridge 18 for a purpose hereinafter explained.

While being loaded, the cartridge 18 is maintained flush against the main support member 13 by a pair of hold-down plates 32 suitably secured to the upper guide block 16 and guide bar 17, respectively, and provided with opposed cantilevered portions adapted to overlie the side bars 26 and 27 of cartridge 18 and retain the latter in place.

Figure 4:
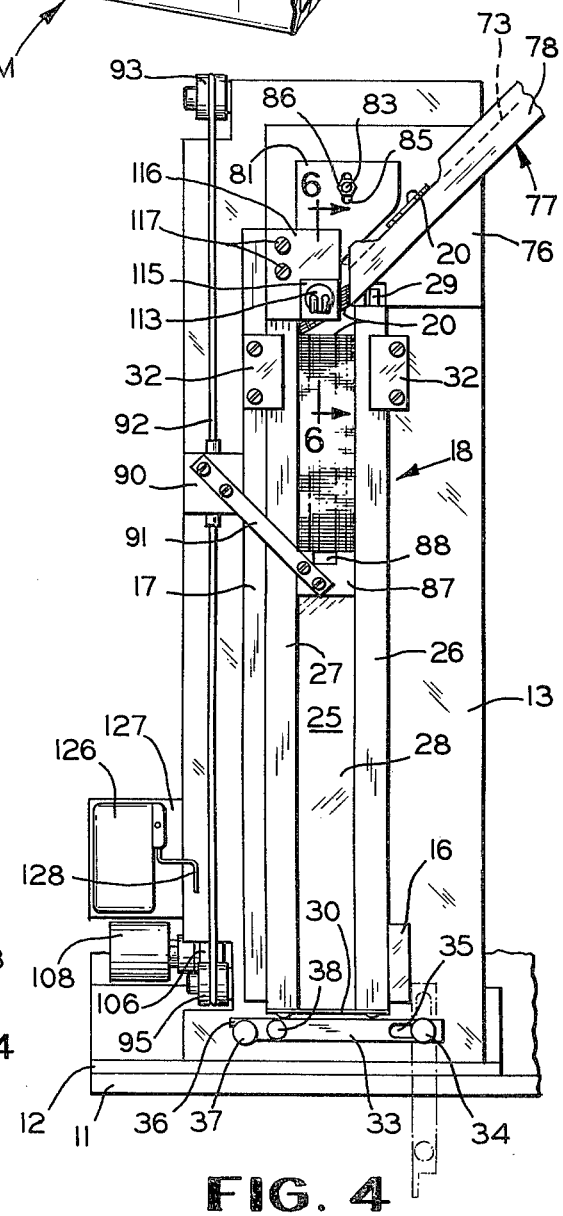
FIG. 4 is a front elevational view of that portion of the loading apparatus shown in FIG. 3, looking in the direction of arrows 4—4 in FIG. 3.

When positioned on main support member 13, the lower end of cartridge 18 rests on a locking bar 33 pivotally mounted adjacent one end thereof on a stud 34 secured to the lower end of main support member 13 and extending through an elongated slot 35 formed in the bar 33. The other end of locking bar 33 is provided with an axial extension 36 of reduced width adapted to engage and seat on a stud 37 coextensive with the stud 34 and spaced in laterally aligned relation therewith. The locking bar 33 is loosely confined laterally between enlarged heads formed on the studs 34, 37 and the front face of main support member 13. A handle 38 projects laterally outwardly from the side of locking bar 33 for facilitating manual operation thereof. In order to release the cartridge 18 for removal from the apparatus 10, locking bar 33 is shifted rearwardly in an axial direction by means of the slot 35-stud 34 arrangement until extension 36 is cleared of stud 37, permitting downward pivotal movement of the bar 33, as shown in FIG. 4.

To prevent inadvertent displacement of the tabs 20 from the loading cartridge 18 and to maintain the tabs in a tight, abutting relation when cartridge 18 is fully loaded, an elongated clamp 39 (FIG. 2) having opposite end lip portions is placed over the tabs and can be held in place by one or more transversely extending strips S of a suitable pressure sensitive adhesive tape.

The tabs 20 are adapted to be ultimately transferred from cartridge 18 into a magazine 40 forming an integral part of a tab laying machine M, shown fragmentarily in FIG. 2 and which is described in detail in the aforementioned co-pending application Ser. No. 443,479, filed Feb. 19, 1974, and assigned to the same assignee as the present invention. The magazine 40 has a cross sectional configuration substantially identical to that of cartridge 18 and is provided with a pair of blind openings at the outer end thereof for receiving the pins 29 provided at the forward end of cartridge 18. When the troughs of the cartridge 18 and magazine 40 are brought into registry by inserting the pins 29 into the magazine openings, the strip S is removed, enabling the entire load of tabs in cartridge 18 to be transferred bodily into the magazine 40 for use in the tab laying machine M. The clamp 29 is removed after the entire contents of the cartridge 29 has been transferred into the magazine 40.

The means for loading tabs 20 into the cartridge 18 comprises a vibrating receptacle 41 and a guide assembly 42 extending from receptacle 41 to the cartridge 18 when the latter is properly positioned against the main support member 13. As shown in FIG. 1, receptacle 41 is mounted on a box-like supporting structure 43 comprised of an upper, horizontal plate 44 secured to the upper ends of a vertical rear plate 45 and a pair of upright side plates 46 fixedly attached at their respective lower ends to the base member 11.

The receptacle 41 includes an article receiving bowl 47 connected by an intermediate neck portion 48 to a lower stem portion (not shown) received in a generally cylindrical base member 49 and operably connected to a suitable electrical vibrating generator 50, also encased within base member 49, to impart vibrations to the bowl 47. As best shown in FIGS. 1 and 7, bowl 47 comprises an outer peripheral wall 51, a substantially flat bottom wall 52, and a spiral track, generally designated 53, following a helical, convoluted path extending from bottom wall 52 at a point 55 spaced radially inwardly from peripheral wall 51 and gradually rising upwardly and radially outwardly toward the peripheral wall 51.

The spiral track 53 has a generally flat surface 56 inclined slightly upwardly in the direction of the helical path to guide the tabs 20 therealong for ultimate conveyance to guide assembly 42 upon vibration of the bowl 47. The flat, axially inclined surface 56 gradually rises along the helical path and then merges, as at 57, into a laterally sloping, radially inwardly inclined surface 58 for gradually urging the advancing tabs 20 from a horizontal to an inclined upright disposition.

As best shown in FIG. 7, the peripheral wall 51 has a first portion of semi-circular configuration in plan extending from the leading end 60 thereof to about midway of the circumferential distance about wall 51 and a second portion of a gradually increasing radius which terminates at a trailing end 61 spaced circumferentially away and radially outwardly from the inner leading end 60 of wall 51. A gap or clearance 62 is formed between the leading and trailing ends 60 and 61 and serves as an outlet for the discharge of tabs 20 from bowl 47. A guide rail 63 is rigidly secured to the inner side of track 53 adjacent the sloping wall surface 58 and defines therewith a channel for guiding and retaining the tabs 20 thereon. A second guide rail 65 also is secured to the inner side of track 53 in an end-to-end relation with rail 63 and extends across the gap 62, terminating along the inner wall surface of wall 51 adjacent the inner end portion 60 thereof. The upper edge of rail 65 is disposed below the the level of the upper edge of rail 63 and defines with wall surface 58 a shallower channel than that afforded by rail 63. While three or four tabs may be stacked in a side-by-side relation in that portion of the channel defined between rail 63 and wall surface 58, no more than two stacked tabs can be accommodated in the channel portion between rail 65 and wall surface 58, the excess spilling over the top of rail 65. The bottom of the sloping surface 58 gradually withdraws from rail 65 midway therealong to define a substantially flat surface 66 which progressively increases in width toward the end of the track.

In operation, the vibratory action imparted to bowl 47 advances tabs 20, randomly deposited therein, along the spiral track 53. Any concentration or pile up of tabs 20 initially deposited or directed onto the track 53 will be gradually dispersed and the excess tabs displaced therefrom along the inner side of the track back into the bottom of the bowl 47. On occasion, three or four tabs will remain in a stacked relation during their advancement along the track. However, when tilted into an inclined position and conveyed into the channel portion defined between rail 65 and shaping wall surface 58, only one, and sometimes two, will remain, the others being dislodged from the upper edge of rail 65.

As the tabs 20 reach surface 66, they are urged from their inclined position to the flat position shown in FIG. 7 for transfer into the guide assembly 42. Any tabs remaining in an upright position as they leave the flat surface 66 will tend to topple over into a horizontal position due to the lack of support offered by the line contact engagement with the edge defining the gap 62 and by the vibratory action imparted thereto. The gap 62 not only assures proper orientation of the tabs, but also provides an outlet for the discharge of dirt, stamping residues and other foreign particles conveyed with the tabs 20 along track 53.

The guide assembly 42 comprises an inclined chute 67 having a bottom wall 68 and a pair of divergent side walls 70 and 71, the wall 70 having a tab portion 72 bent over the end portion 60 of wall 51. Tab 72 connects the chute 67 to bowl 47 for vibration therewith to facilitate movement of the tabs 20 downwardly therealong. The upper end of chute bottom wall 68 is in general axial registry with the flat surface 66 of the track 53 for receiving the tabs 20 discharged therefrom and the lower end of wall 68 is substantially co-axially aligned with the flat upper surface 73 of a slide 75, as best shown in FIG. 9. Slide 75 is formed of an elongated metal bar having a generally rectangular configuration in cross section and is rigidly secured adjacent its lower end to a plate 76, in turn affixed to the main support member 13. The lower end of slide 75 has an end face 74 and is disposed in close proximity to the upper end of cartridge 18 when positioned in place against the main support member 13 to discharge the tabs 20 thereinto.

An inverted U-shaped member 77 serves as a cover for slide 75 confining the tabs 20 thereon and is provided with a pair of elongated side walls 78 secured to the opposite sides of slide 75 by any suitable fasteners and a top wall 80 extending above the slide upper surface 73 in spaced relation thereto and in substantial parallelism therewith. The inner side wall 78 and top wall 80 is cut away adjacent the lower ends thereof to provide clearance for plate 76. The side walls 70 and 71 of chute 67 are reduced in depth adjacent the lower end thereof, as shown in FIG. 9, for insertion in the opening defined between the slide upper surface 73 and cover wall 80. The relative shallow spacing between the cover wall 80 and chute bottom wall 68 at the lower end of chute 67 precludes the ingress of any tabs which are disposed in a generally upright plane and assures the proper horizontal disposition of the tabs admitted onto slide 75. Also, a tab guide block 81 (FIG. 8), secured against the plate 76, is provided with an inclined surface 82 parallel to and slightly spaced from slide surface 73 to further assist in maintaining the tabs 20 in a flat orientation as they are advanced downwardly along slide 75.

A pin 83 extends laterally outwardly from plate 76 and through a vertical slot 85 formed in block 81 to permit vertical adjustment of the latter and thereby the spacing between surfaces 82 and 73. Pin 83 is threaded at its outer end to receive a lock nut 86 or the like for retaining the block 81 in the selected adjusted position relative to slide 75. When cartridge 18 is properly positioned in place, the lower, triangularly shaped end portion 84 (FIG. 8) of block 81 projects slightly into the upper end of trough 28, thus guiding the tabs 20 sliding off surface 73 into trough 28.

In order to assure proper stacking of the tabs 20 in a flat, horizontal attitude in cartridge 18, the gravity free fall distance of the tabs 20 is kept to a minimum by the provision of a cartridge slide block 87 (FIGS. 1 and 4) removably disposed and axially movable in cartridge trough 28 to progressively change the effective length of the latter. Slide block 87 is intermittently moved by control means, hereinafter described, and comprises a generally rectangularly shaped body having a recess 88 formed in the upper surface thereof for facilitating the manual manipulation of the block 87 within trough 28 and the withdrawal of block 87 therefrom when the cartridge is substantially filled.

The means for moving slide block 87 includes a drive block 90 suitably connected to the slide block 87 by a tie bar 91 and mounted on a cable 92 for axial movement therewith and rotatable movement relative thereto. The cable 92 is movable in an endless orbital path and is trained about spaced idler pulleys 93 and 95 both suitably journalled on shafts extending outwardly from mounting blocks secured to the main support member 13. The cable is kept taut by means of a spring 96 interposed between the spliced ends 97 thereof.

The cable drive means includes an electric motor 100 (FIG. 5) suitably connected to a J-shaped bracket 101 pivotally mounted, as by means of a pivot pin 102, between a pair of plates 103 secured to the mounting plate 12. Motor 100 is provided with a drive shaft 105 extending through the bracket 101 and circumferentially engagable with the peripheral surface of a drive wheel 106 suitably journalled on a shaft 107 and projecting laterally outwardly from the bracket 101. The peripheral surface of drive wheel 106 also engages the cable 92 adjacent pulley 95 and the tractive force generated therebetween drives cable 92 in its orbital path to move slide block 87 in cartridge trough 28. A handle 108 is mounted on the distal end of shaft 107 for manually pivoting wheel 106 and the associated bracket 101 upwardly out of the way to disengage wheel 106 from tractive contact with the cable 92.

As best shown in FIG. 6, a photoelectric cell 110 is encased within an insulated housing 111 releasably secured to the rear face of main support member 13 by a clamp 112. The photocell 110 receives a light beam from a light source in the form of a lamp 113 mounted in a holder 115 secured to a support plate 116, in turn connected by suitable fasteners extending through a spacer 118 to the main support member 13. The light beam emitted from lamp bulb 113 projects through an opening 120 formed in plate 116, across the space through which the tabs fall by gravity when leaving slide 75, and then through aligned openings 121 and 122 of plate 76 and main support member 13, respectively, onto the photoelectric cell 110.

Photocell 110 is connected by a lead 123 to a suitable electrical control circuit (not shown) encased in a control box 125 and connected to a suitable source of electric power (also not shown). This control circuitry includes the usual amplifier for the output of the photoelectric cell and other conventional components to transmit the output of such cell to a signal responsive means which controls the operation of motor 100. Interruption of the light beam for a predetermined time is effective to energize motor 100 and thereby drive wheel 106 to effect movement, via cable 92, block 90 and tie bar 91, of the slide block 87. The temporary interruption of the light beam caused by the tabs 20 during free fall off slide 75 is not of sufficient duration to energize photocell 110.

A limit switch 126 (FIGS. 3 nd 4) is mounted on a bracket 127 affixed to the main support member 13 and is provided with an actuator 128 disposed in the path of movement of drive block 90. Limit switch 126 is incorporated in the electrical control circuit for opening said circuit and terminating operation of the motor 100 and the drive wheel 106. A manual on-off switch 130 also is mounted on the control box 125 for energizing and de-energizing the control circuit for motor 100. An indicator lamp 131 is operably connected to the control circuitry and, when illuminated, indicates that the control circuitry is energized. A rheostat 132, mounted on control box 125, is provided for varying the intensity of the light emitted by lamp 113.

A control box 133, electrically plugged into control box 125 and connected to the vibrating generator 50, also is mounted on base member 11 for controlling operation of the vibrating generator 50. A manual on-off switch 134 on the box 133 is operative to energize and de-energize the control circuit for vibrating generator 50. Also, a rotatable control knob 135 is mounted on the control box 133 for varying the speed of vibrating generator 50, as desired.

The mode of operation of loading apparatus 10 is as follows:

With the locking bar 33 swung downwardly out of the way into the position shown in phantom in FIG. 4, a fresh cartridge 18 is inserted upwardly between the spaced guide blocks 16 and guide bar 17 until the leading end thereof engages the bottom of plate 76, which serves as an upper stop for properly positioning the cartridge 18. The pins 29 are received in spaced cavities 79 formed in the bottom edge of plate 76. The locking bar 33 is then swung upwardly and shifted axially to bring the extension 36 over stud 37, securing the cartridge 18 in place. With the drive wheel 106 pivoted upwardly out of engagement with cable 92, slide block 87 is inserted in the cartridge trough 28 and, together with drive block 90, is manually moved upwardly to its uppermost position. A single tab 20 is placed across the upper end of slide block 87 prior to lifting the same into its uppermost position.

Figure 3:
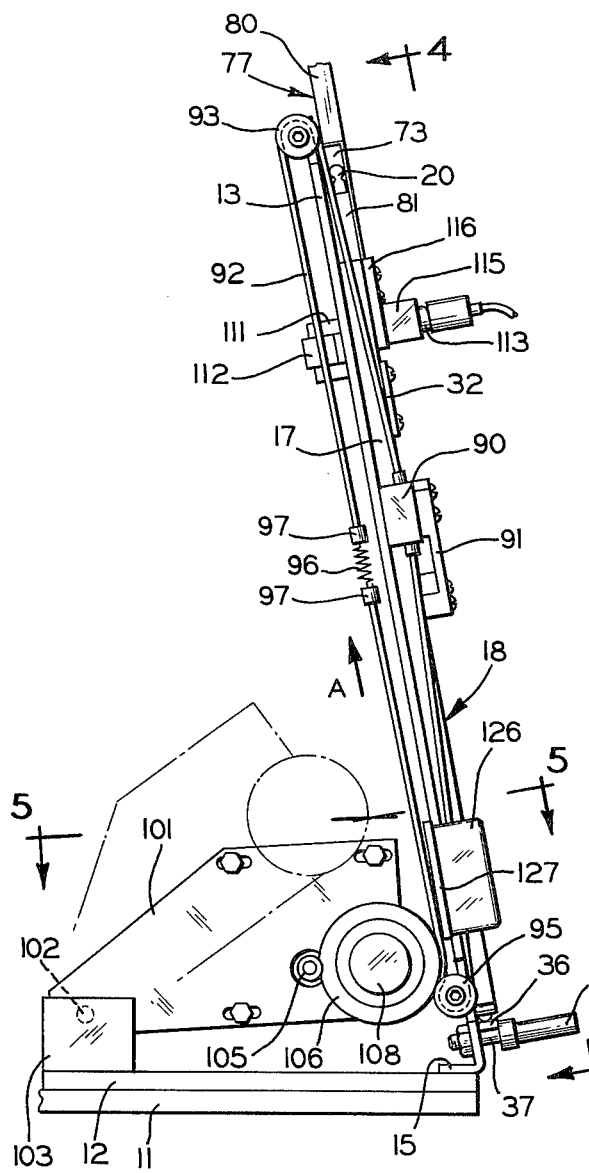
FIG. 3 is a side elevational view of a portion of the loading apparatus of FIG. 1.

The drive wheel 106 is then returned to its cable engaging position, as shown in full lines in FIG. 3, and the bowl 47 is adequately filled with more than the number of tabs required to load a single cartridge. The switches 130 and 134 are actuated to energize the control circuit for motor 100 and to activate the vibrating generator 50, respectively, the latter imparting vibrations to bowl 47 for starting the loading operation. The tabs 20 are advanced along 53 by the vibratory action imparted to bowl 47 and are discharged therefrom across the gap 62 and into chute 47. The tabs slide down chute 67 and are transferred onto the upper surface 73 of slide 75 from which they are discharged by way of gravity into the upper open end of the cartridge trough 28. However, the lower end face 74 of slide 75 projects inwardly of the inner wall surface of cartridge side bar 26 and does not provide sufficient clearance for the tabs to be deposited in a horizontal attitude in the trough when the uppermost tab on slide block 87 is within a predetermined distance from the upper end of trough 18, such as occurs when the slide block is in its uppermost position or at successively lower positions in the trough with an accumulation of stacked tabs thereon, as shown in FIG. 8. At such times, the tabs dropping off slide 75 will stack up in an inclined position with their lower ends disposed in trough 28 and their upper ends resting against the end face 74 of slide 75. These inclined tabs assume an attitude having only a slightly lesser angle of inclination than the angle at which they leave the slide 75.

The tabs 20 continue to pile up in an inclined attitude until opening 121 is blocked, interrupting the light beam to photoelectric cell 110 for a sufficient length of time to trigger the signal responsive means and energize motor 100. Energization of motor 100 is effective to rotate drive wheel 106 and move the cable 92 in the direction of arrow A in FIG. 3 to lower drive block 90 which carries slide block 87 downwardly therewith. As the slide block 87 and the stack of tabs 20 supported thereby are lowered, the upper ends of the inclined tabs will clear the end face 74 of slide 75 and fall in an arcuate path through a relatively small distance into the proper horizontal attitude onto the horizontally stacked pile of tabs accumulated on slide block 87. When the upper level of the inclined stack of tabs drops below opening 121, the light beam emitted from lamp 113 will pass therethrough onto cell 110 to effect de-energization of the motor 100 and stop movement of the slide block 87. The above cycle is repeated each time the level of the stack of inclined tabs blocks opening 121 to intermittently lower the slide block 87. In this manner, the free fall distance of the tabs is kept to a minimum to decrease the possibility of the tabs reorienting themselves into an upright or cocked attitude and assure the self orienting stacking thereof in the proper flat, horizontal position. By way of example, the slide block is lowered in increments ranging from about 1/16 to ⅛ of an inch to receive from 4 to 8 tabs on each descent, each of the tabs having a thickness of approximately .015 inches. It should be understood that the above increments of slide block movement, as well as the specific configuration and width dimension of the articles being handled, are exemplary only and are not in any way used in a limiting sense, the loading apparatus of this invention having utility in handling a wide range of articles having various shapes and dimensions.

A significant feature of this invention in assuring the proper horizontal stacking of the tabs 20 in cartridge trough 28 resides in the maintenance of a limited clearance between the upper level of the horizontally stacked tabs on slide block 87 and the lower end of slide surface 73, together with the reduced width of the clearance as determined by the lower end face 74 of slide 75. This arrangement causes the tabs 20 to bodily drop only a short distance from slide surface 73 into an inclined attitude with one end thereof abutting against slide end face 74, such one end subsequently being freed of slide end face 74 for downward arcuate movement through a relatively small distance into a horizontal, stacked position upon downward movement of the slide block 87. The latter, in turn, moves only a relatively short distance, as determined by the re-establishment of the light beam on photocell 110, to space the upper level of the horizontally stacked tabs within a predetermined distance from the lower end of slide surface 73 and thus maintain such limited clearance therebetween.

The slide block 87 is intermittently moved downwardly as described above, until it engages the actuator 128 of limit switch 126 to open the control circuit and terminate operation of the vibrating generator 50, the motor 100, and drive wheel 106. Thus, generator 50, motor 100 and the drive wheel 106 are disabled and the slide block 87 is positioned adjacent to or in close proximity to the bottom end plate 30 of cartridge 18.

To remove a loaded cartridge 18, switch 130 is turned off to positively prevent inadvertent activation of generator 50 and motor 100 and the drive wheel 106 is disengaged from cable 92 by manually pivoting bracket 101 in a counter-clockwise direction, as viewed in FIG. 3. The slide block 87 is then manually lowered to the bottom of the cartridge trough 28. This lowers the upper level of the stacked tabs 20 in trough 28 and the remaining tabs resting against the end face of slide 75 drop into the upper end of the trough. Clamp 39 is placed over the stack of tabs 20 by inserting the lower end lip portion thereof into slide block recess 88 and can be secured in place by applying the pressure sensitive adhesive strips S thereacross. The slide block 87 is then withdrawn out of the trough 28 by pivoting block 87, together with tie bar 91 and drive block 90, approximately 90° relative to the cable 92. The stack of tabs 20, held together by clamp 39, is then lowered to the bottom of the cartridge trough 28. The locking bar 33 is shifted axially to the right, as viewed in FIGS. 1 and 4, to clear stud 37 and allow the bar 33 to swing downwardly out of the way for enabling the loaded cartridge 18 to be slid downwardly for removal.

From the foregoing, it is apparent that the objects of this invention have been fully accomplished. As a result of this invention, a loading apparatus is provided for automatically feeding and loading articles into a cartridge into a compact, stacked relation for subsequent usage in a production machine. A removable slide block is positioned in the cartridge trough and serves as the bottom wall thereof. The block a axially slidable in the trough to alter the effective length thereof. A guide arrangement directs generally flat articles into the upper end of the trough for accumulation on the slide block in a stacked relation. A photoelectrical control, responsive to the upper level of the stacked articles, is operative to intermittently lower the slide block, providing the proper clearance between the upper level of the stacked articles and the discharge point of the guide arrangement to assure the desired self-orientation of the articles in the cartridge trough.

It is to be understood that the form of the invention herewith shown and described is to be taken as a preferred embodiment of the same, and that various changes in the shape, size, and arrangement of parts may be resorted to without departing from the spirit of the invention.

We claim:

1. An apparatus for loading articles into a cartridge comprising: a frame, means on said frame for supporting a cartridge in a generally upright position, said cartridge having an open trough extending lengthwise thereof, means on said frame for guiding generally flat articles into the upper end of said trough, movable means disposed in said trough for supporting said articles in a horizontally stacked relation in said trough up to a predetermined distance from the lower end of said guide means, said guide means having means orienting said articles in a flat attitude during advancement therealong, said guide means also including means for directing additional articles in the upper end of said trough in a stacked, tilted position resting on said horizontally stacked articles, and means responsive to the upper level of said stacked tilted articles for controlling axial movements of said support means within said trough to change the effective length thereof and maintain the upward level of said horizontally stacked articles on said support means within a predetermined distance from said lower end of said guide means.

2. An apparatus according to claim 1, wherein said guide means includes an inclined chute and an inclined slide provided with a flat surface, said chute having a bottom wall terminating in an end portion overlapping the upper portion of said flat surface to form a substantially continuous surface therewith.

3. An apparatus according to claim 1, wherein said guide means includes a slide and a cover secured to said slide, said orienting means including a portion of said cover overlying said flat surface in closely spaced relation thereto to assure the desired self-orientation of said articles in a flat attitude.

4. An apparatus according to claim 1, in combination with a receptacle mounted on said frame above said guide means for containing a multiplicity of randomly dispersed articles, said receptacle having an outlet in close proximity to said guide means, and means for directing said articles in said receptacle to said outlet upon vibratory movement of said receptacle for discharge into said guide means.

5. An apparatus according to claim 4, wherein said guide means includes an inclined chute and an inclined slide provided with said flat surface, said chute having a bottom wall terminating in an end portion overlapping the upper portion of said flat surface to form a substantially continuous surface therewith.

6. An apparatus according to claim 4, wherein said guide means includes a slide and a cover secured to said slide, said orienting means including a portion of said cover overlying said flat surface in closely spaced relation thereto to assure the desired self-orientation of said articles in a flat attitude.

7. An apparatus for loading articles into a cartridge comprising: a frame, means on said frame for supporting a cartridge in a generally upright position, said cartridge having an open trough extending lengthwise thereof, guide means on said frame for directing generally flat articles into the upper end of said trough, movable means disposed in said trough for supporting said articles in a horizontally stacked relation in said trough, and means controlling axial movements of said support means within said trough to change the effective length thereof and maintain the upper level of said stacked articles on said support means within a predetermined distance from the lower end of said guide means, said control means including means providing limited clearance between the upper level of horizontally stacked articles on said support means and said lower end of said guide means whereby additional articles received in said trough are stacked in a tilted position, means sensing the upper level of said stacked tilted articles, and means responsive to said sensing means for moving said support means downwardly to provide sufficient clearance at the upper end of said trough enabling at least certain of said tilted articles to drop into a horizontal position on said horizontally stacked articles and thereby lower the upper level of said tilted stack of articles.

8. An apparatus for loading articles into a cartridge comprising: a frame, means on said frame for supporting a cartridge in a generally upright position, said cartridge having an open trough extending lengthwise thereof, guide means on said frame for directing generally flat articles into the upper end of said trough, movable means disposed on said trough for supporting said articles in a horizontally stacked relation in said trough, and means controlling axial movements of said support means within said trough to change the effective length thereof and maintain the upper level of said stacked articles on said support means within a predetermined distance from the lower end of said guide means, said guide means including an inclined chute and an inclined slide having an upper surface, said chute having a bottom wall terminating in an end portion overlapping the upper portion of said slide surface to form a substantially continuous surface therewith, said guide means further including a block mounted on said frame adjacent the lower end of said slide and having an inclined surface in closely spaced relation to said slide upper surface in substantial parallelism therewith, said inclined surface terminating at a point within the upper end of said trough.

9. An apparatus for loading articles into a cartridge comprising: a frame, means on said frame for supporting a cartridge in a generally upright position, said cartridge having an open trough extending lengthwise thereof, guide means including an inclined flat surface on said frame for directing generally flat articles into the upper end of said trough, said guide means having means orienting said articles in a flat attitude against said flat surface during advancement therealong, movable means disposed in said trough for supporting said articles in a horizontally stacked relation in said trough, and means controlling axial movements of said support means within said trough to change the effective length thereof and maintain the upper level of said stacked articles on said support means within a predetermined distance from the lower end of said guide means, a receptacle mounted on said frame above said guide means for containing a multiplicity of randomly dispersed articles, said receptacle having an outlet in close proximity to said guide means, means for directing said articles in said receptacle to said outlet upon vibratory movement of said receptacle for discharge into said guide means, said guide means including an inclined chute and an inclined slide provided with said flat surface, said chute having a bottom wall terminating in an end portion overlapping the upper portion of said flat surface to form a substantially continuous surface therewith, said orienting means including a block mounted on said frame adjacent the lower end of said slide and having an inclined surface in closely spaced relation to said slide flat surface in substantial parallelism therewith, and said inclined surface terminating at a point within the upper end of said trough.

* * * * *